(12) United States Patent
Xie et al.

(10) Patent No.: US 12,340,233 B2
(45) Date of Patent: Jun. 24, 2025

(54) METHOD FOR OPERATING APPLICATION PROGRAM, TERMINAL DEVICE AND COMPUTER-READABLE STORAGE MEDIUM

(71) Applicant: PAX COMPUTER TECHNOLOGY (SHENZHEN) CO., LTD., Guangdong (CN)

(72) Inventors: Lihong Xie, Guangdong (CN); Yanfei Wang, Guangdong (CN); Xiaojin Sun, Guangdong (CN)

(73) Assignee: PAX COMPUTER TECHNOLOGY (SHENZHEN) CO., LTD., Guangdong (CN)

( * ) Notice: Subject to any disclaimer, the term of this patent is extended or adjusted under 35 U.S.C. 154(b) by 0 days.

(21) Appl. No.: 18/026,743

(22) PCT Filed: Jul. 14, 2021

(86) PCT No.: PCT/CN2021/106162
§ 371 (c)(1),
(2) Date: Mar. 16, 2023

(87) PCT Pub. No.: WO2022/057418
PCT Pub. Date: Mar. 24, 2022

(65) Prior Publication Data
US 2024/0411568 A1 Dec. 12, 2024

(30) Foreign Application Priority Data
Sep. 17, 2020 (CN) .......................... 202010978033.9

(51) Int. Cl.
*G06F 9/445* (2018.01)

(52) U.S. Cl.
CPC ................................ *G06F 9/44536* (2013.01)

(58) Field of Classification Search
None
See application file for complete search history.

(56) References Cited

U.S. PATENT DOCUMENTS

2003/0074656 A1    4/2003   Irino
2005/0257206 A1*  11/2005   Semerdzhiev ............ G06F 8/65
                                                                    717/168
(Continued)

FOREIGN PATENT DOCUMENTS

CN    102750167 A    10/2012
CN    104281463 A     1/2015
(Continued)

*Primary Examiner* — Ryan D. Coyer
(74) *Attorney, Agent, or Firm* — Brooks Kushman P.C.

(57) ABSTRACT

A method and an apparatus for operating an application program, a terminal device, and a storage medium. The method includes: determining a target version from multiple versions of the application program, and determining first parameter information of the application program of the target version; obtaining second parameter information of the application program transmitted by a bootloader; calculating a target memory address of an executed target element of the script file in the application program of the target version according to the first parameter information and the second parameter information; operating the target element of the script file in the target memory address. By applying the method, the application program can still be normally operated even though an actual operation address of the application program in the terminal device is different from a designated chained address when the application program is linked.

13 Claims, 6 Drawing Sheets

(56) References Cited

U.S. PATENT DOCUMENTS

| | | | | |
|---|---|---|---|---|
| 2007/0261044 | A1* | 11/2007 | Clark | G06F 9/44536 |
| | | | | 717/130 |
| 2015/0100952 | A1 | 4/2015 | Tornow et al. | |
| 2017/0357558 | A1* | 12/2017 | Kato | G06F 11/1479 |
| 2019/0073230 | A1* | 3/2019 | Ruder | G06F 9/44536 |
| 2020/0184078 | A1* | 6/2020 | Hinrichs | H04L 9/3268 |
| 2022/0075636 | A1* | 3/2022 | Francis | G06F 9/45512 |

FOREIGN PATENT DOCUMENTS

| | | |
|---|---|---|
| CN | 109408139 A | 3/2019 |
| CN | 109814939 A | 5/2019 |
| CN | 110892378 A | 3/2020 |
| CN | 111124550 A | 5/2020 |
| CN | 112130926 A | 12/2020 |

\* cited by examiner

METHOD FOR OPERATING APPLICATION PROGRAM, TERMINAL DEVICE AND COMPUTER-READABLE STORAGE MEDIUM

CROSS-REFERENCE TO RELATED APPLICATIONS

The present application is a 35 U.S.C. § 371 national stage application of PCT patent application No. PCT/CN2021/106162, filed on Jul. 14, 2021, which claims priority to Chinese patent application No. 202010978033.9, filed on Sep. 17, 2020. The entire contents of which are incorporated herein by reference.

FIELD

The present application relates to the field of information technology, and more particularly, to a method for operating application program, a terminal device and a computer-readable storage medium.

BACKGROUND

At present, regarding an application program installed in a terminal device, a linker generally specifies a linked operation address of the application program in the terminal device when the application program is linked. When the application program is operated, the terminal device may operate the application program according to the linked operation address of the terminal device. However, if two or more versions of the application programs are stored in the terminal device, the compiler needs to specify a corresponding link operation address for each of the application programs. However, it is difficult for the terminal device to distinguish the difference among the various versions of application programs, so that the terminal device cannot determine the correct linked operation address of the currently started application program. Therefore, an inconsistency between the linked operation address of the application program and the actually used operation address may be caused, and the application program may not be operated normally.

SUMMARY

The embodiments of the present application provide a method and an apparatus for operating an application program, a terminal device and a storage medium, which can solve the problem that the application may not be normally operated when a linked operation address is inconsistent with an actually used operation address.

In the first aspect, a method for operating an application program is provided in one embodiment of the present application, the method includes:
determining a target version of the application program from multiple versions of the application program, and determining first parameter information of the application program of the target version;
obtaining second parameter information of the application program transmitted by a bootloader;
determining a target memory address of an executed target element of a script file in the application program of the target version according to the first parameter information and the second parameter information; and
operating the target element of the script file in the application program of the target version in the target memory address so as to operate the application program of the target version.

In one embodiment, said determining the target version of the application program from multiple versions of the application program includes:
loading an operating environment by the bootloader in the terminal device, and obtaining multiple versions of the application program in a preset storage position in the operating environment;
parsing file header information of the multiple versions of the application program respectively to obtain multiple version information of the application program; and
determining the target version from the multiple versions of the application program according to the multiple version information.

In one embodiment, the target element of the script file includes a global offset table; the target memory address includes a global offset table address; the first parameter information comprises: a first memory start address stored in a memory and designated by a linker when the application program of the target version is linked, and a first memory address of the global offset table stored in the memory after the global offset table in the application program of the target version is linked; the second parameter information includes a second memory start address in the memory, which is actually used by the application program of the target version during operation of the application program of the target version.

Said calculating the target memory address of the executed target element of the script file in the application program of the target version according to the first parameter information and the second parameter information includes:
obtaining the first memory start address and the first memory address in the first parameter information, and obtaining the second memory start address in the second parameter information;
calculating a first offset value of the global offset table in the memory during operation of the application program of the target version according to the first memory start address and the second memory start address; and
determining, according to the first memory address and the first offset value, a global offset table address of the global offset table stored in the memory during operation of the application program of the target version.

In one embodiment, the target element of the script file further includes a plurality of global variables, the target memory address further includes a target global variable address, and a plurality of variable memory addresses of the plurality of global variables are stored in the global offset table;
after said determining the second target memory address of the global offset table stored in the memory according to the first memory address and the first offset value during operation of the application program of the target version, the method further includes:
obtaining second memory addresses allocated by the linker to the plurality of global variables respectively when the plurality of global variables are linked;
determining a plurality of variable memory addresses of the plurality of global variables stored in the memory respectively according to the second memory addresses and the first offset value; and determining the target global variable address from the plurality of variable memory addresses in the global offset table during operation of the application program of the target version.

In one embodiment, the target element of the script file further includes a plurality of global functions, the global offset table address further includes an objective function operation address, the global offset table stores a plurality of function operation addresses corresponding to the plurality of global functions respectively; the first parameter information further includes a first operation address of the currently operated application program of the target version in a flash memory designated by the linker when the application program of the target version is linked, and second operation addresses respectively allocated to the plurality of global functions by the linker when the plurality of global functions are linked; the second parameter information further includes a third operation address actually used by the application program of the target version in the flash memory during operation of the application program of the target version.

After said determining, according to the first memory address and the first offset value, a global offset table address of the global offset table stored in the memory during operation of the application program of the target version, the method further includes:

obtaining the first operation address and the second operation address in the first parameter information, and obtaining the third operation address in the second parameter information;

calculating second offset values of the plurality of global functions in the flash memory during operation of the application program of the target version according to the first operation address and the third operation address;

respectively calculating the plurality of function operation addresses of the plurality of global functions in the flash memory during operation of the global functions according to the second operation address and the second offset values; and determining the objective function operation address from the plurality of function operation addresses in the global offset table during operation of the application program of the target version.

In one embodiment, the target element of the script file further includes a plurality of interrupt handlers in an interrupt vector table, the first parameter information further includes a plurality of fourth operation addresses respectively allocated to the plurality of interrupt handlers by the linker when the interrupt vector table is generated by the linker; the method further includes:

dividing a flash memory region in the flash memory as the interrupt vector table for storing the plurality of interrupt handlers during operation of the application program of the target version;

obtaining the plurality of fourth operation addresses in the first parameter information, and respectively calculating a plurality of interrupt handler operation addresses of the plurality of interrupt handlers in the flash memory during actual operation of the plurality of interrupt handlers according to the second offset value and the plurality of fourth operation addresses;

storing the plurality of interrupt handler operation addresses and associated information of the plurality of interrupt handlers corresponding to the plurality of interrupt handler operation addresses in the interrupt vector table; and determining, if the application program of the target version is abnormally interrupted in an operation process, a target interrupt handler operation address from the plurality of interrupt handler operation addresses contained in the interrupt vector table according to the associated information of the plurality of interrupt handlers, and operating an interrupt handler corresponding to the target interrupt handler operation address.

In one embodiment, the second parameter information further includes an available memory length of the application program of the target version. The method further includes:

obtaining a remaining memory value of the memory in the terminal device;

terminating a starting procedure of the application program of the target version if the available memory length is greater than the remaining memory value; or alternatively starting the application program of the target version if the available memory length is less than or equal to the remaining memory value.

In the second aspect, a terminal device is provided in one embodiment of the present application. The terminal device includes a memory, a processor, and a computer program stored in the memory and executable by the processor. Where the processor is configured to, when executing the computer program, implement the method according to any item of the first aspect.

In the third aspect, a non-transitory computer-readable storage medium is provided in one embodiment of the present application. The computer-readable storage medium stores a computer program, that, when executed by a processor of a terminal device, causes the processor of the terminal device to implement the method according to any item of the first aspect.

In the fourth aspect, a computer program product is provided in one embodiment of the present application, when the computer program product is executed on the terminal device, the terminal device is caused to perform the method according to any item of the first aspect.

According to the embodiments of the present application, the target version of the application program is determined from multiple versions of the application program, the first parameter information of the target version is determined, the second parameter information transmitted by the bootloader is obtained, the target memory address of the target element in the executed script file can be determined, such that the target memory address of the target element in the executed script file can still be calculated even if the actual operation address of the application program in the terminal device is different from the designated linked address when the application program is linked. Furthermore, during operation of the application program, an effect that the target memory address of the application program is not affected by the linked address designated by the linker may be achieved, and an objective of operating the application program in any address may be achieved.

BRIEF DESCRIPTION OF THE DRAWINGS

In order to describe the technical solutions in the embodiments of the present application more clearly, a brief introduction regarding the accompanying drawings needed to be used for describing the embodiments or existing technology is given below. It is obvious that, the accompanying drawings described below are only some embodiments of the present application. A person of ordinary skill in the art may also obtain other drawings according to the current drawings without paying creative efforts.

DETAILED DESCRIPTION OF EMBODIMENTS

In the following descriptions, in order to describe but not intended to limit the present application, concrete details including specific system structure and technique are proposed to facilitate a comprehensive understanding of the embodiments of the present application. However, a person of ordinarily skill in the art should understand that, the present application can also be implemented in some other embodiments from which these concrete details are excluded. In other conditions, detailed explanations of system, device, circuit and method well known to the public are omitted, such that unnecessary details which are disadvantageous to the understanding of the description of the present application can be avoided.

It should be understood that, when a term "comprise/include" is used in the description and annexed claims, the term "comprise/include" indicates existence of the described characteristics, integer, steps, operations, elements and/or components, but not exclude existence or adding of one or more other characteristics, integer, steps, operations, elements, components and/or combination thereof.

It should be further understood that, terms "and/or" used in the description and the annexed claims of the present application are referred to as any combination of one or a plurality of listed item(s) associated with each other and all possible items, and including the combinations thereof.

In addition, in the descriptions of the present application, terms such as "first" and "second", "third", etc., are only used for distinguishing purpose in description, but shouldn't be interpreted as indication or implication of a relative importance.

The method for operating application program provided in this embodiment of the present application may be applied to a terminal device such as a mobile phone, a tablet computer, a notebook computer, an ultra-mobile personal computer (Ultra-mobile Personal Computer, UMPC), a netbook, and the like. The specific type of the terminal device is not limited in this embodiment of the present application.

Figure 1:
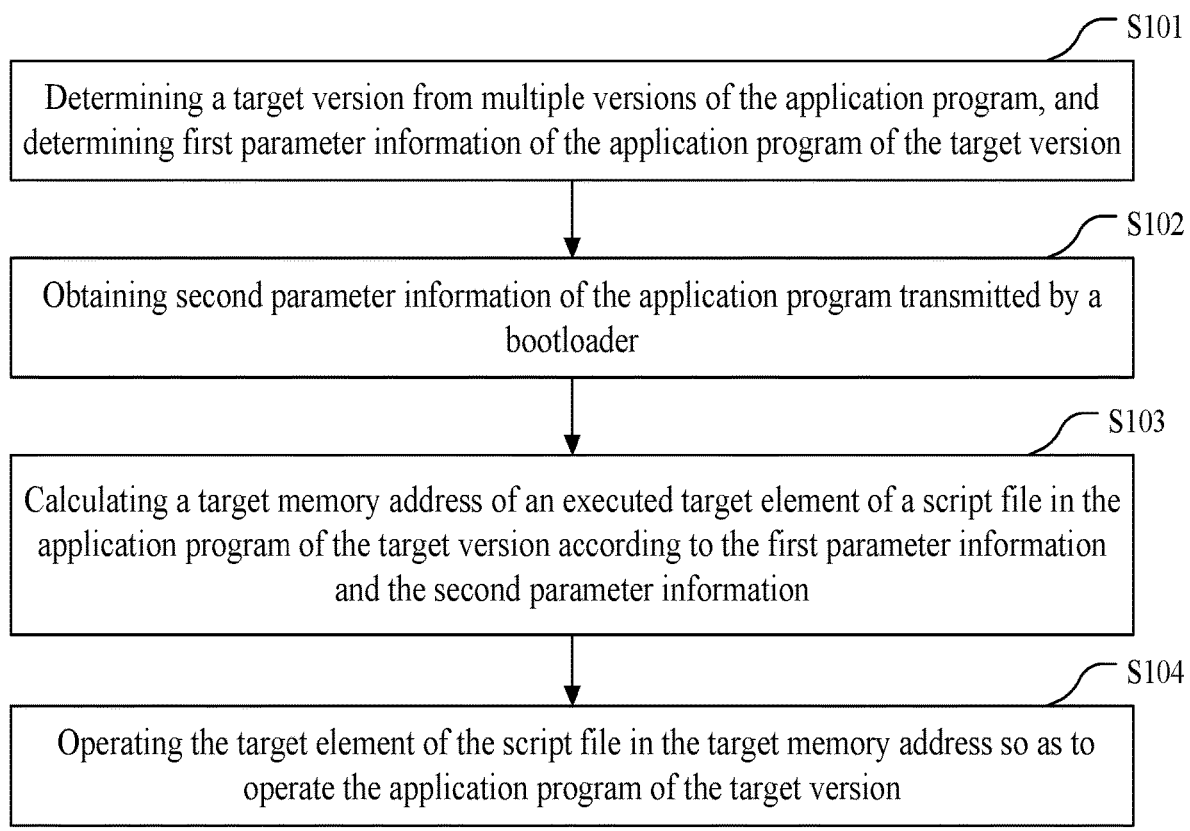
FIG. 1 illustrates an implementation flowchart of a method for operating an application program according to one embodiment of the present application.

Referring to FIG. 1, FIG. 1 illustrates a flowchart of a method for operating an application program according to one embodiment of the present application. This method includes the following steps:

In the step of S101, a target version of the application program is determined from multiple versions of the application program, and first parameter information in the target version of the application program is determined.

In one embodiment, multiple versions of the application program may be pre-stored in the terminal device, where multiple versions may be the versions having consistent version information, or be different versions having different version information. Where the target version may be the latest version having the newest version information in multiple versions of the application program. In particular, if the application program has a version A and a version B, when the application program is upgraded, if the currently operated application program is the application program of the A version and is stored in a storage space A, in order to ensure a normal operation of the application program, the version B stored in a storage space B may be upgraded. Moreover, when the application program is operated next time, the version B is determined as the target version and is operated, and the application program corresponding to the version A in the storage space A is upgraded simultaneously. The aforesaid application program may be an application program for transaction, or be an application program for entertainment. The types of the application program are not limited herein. It should be noted that most applications for transaction are related to direct benefit interactions, while the applications for entertainment generally do not involve interaction of benefits. Therefore, it is considered that the terminal device may store multiple versions of the transactional application program, so that the application program can also be operated normally in an upgrading process.

In one embodiment, the first parameter information is necessary information for the application program to perform relative addressing during operation. The relative addressing is an addressing mode of forming a new program counter (Program Counter, PC) value by taking the content of the current PC as a base address and adding one byte's complement number (offset value) given by an instruction, and this addressing mode is referred to as the relative addressing. The program counter PC is configured to store an address of an instruction to be executed currently, a direct path is existed between the counter PC and the main memory, and the program counter PC has the function of self-adding 1, so that an address of a next instruction may be generated.

In one embodiment, the first parameter information may be stored in a file header of the application program, and a standard elf section may be used as a storage format of the first parameter information for saving application program file header information. A compatible and universal elf file parsing tool is used for parsing the application program header file. Where elf is a file format, and the section is constituted as the content of the code file corresponding to the first parameter information. In addition, when the first parameter information includes, but is not limited to, a first memory start address used in a memory and designated by a linker when the application program is linked. As an alternative, the first parameter information includes, but is not limited to, an operation address used by the application program in the flash memory and designated by the linker when the application is linked, which is not limited herein.

In the step of S102, second parameter information of the application program transmitted by the bootloader is obtained.

In one embodiment, the bootloader is a startup program which is installed in the terminal device or in another computer application, and is configured to guide the operating system to be started. When the application program is started by the bootloader, storage information and initial operation information of the application program in the terminal device may be obtained by the bootloader. The storage information and the initial operation information of the application program may be considered as a part or the entire of the second parameter information of the application program transmitted by the bootloader. For example, when the second parameter information includes, but is not limited to, during operation of the application program, a second memory start address actually used in the memory, an operation address actually used in the flash memory during operation of the application program. The second parameter information is not limited herein.

In one embodiment, after obtaining the second parameter information, the bootloader may store the second parameter information in registers of a microcontroller, respectively. For example, if the second parameter information includes three parameters, the three parameters may be randomly stored in three registers of R0, R1 and R2 in the microcontroller, respectively, and the parameter information stored in each of the registers R0, R1 and R2 are determined respectively. Then, when the application program of the terminal device is operated, the specified parameter may be obtained through the registers R0, R1 and R2 and is processed.

In the step of S103, a target memory address of a target element of the script file in the application program of the target version during operation is calculated according to the first parameter information and the second parameter information.

In one embodiment, the target element in the script file includes, but is not limited to, information such as a global variable and a global function. The global variable and the global function may be referenced by a functional program of one or a plurality of script files so as to implement corresponding functions of the application program.

In one embodiment, the actual operation address of the application program in the terminal device is generally the same with the chained address designated by the linker when the application program is linked, or is the same as the memory address of the application program stored in the terminal device. In this condition, the target memory address of the script file in the application program of the target version during operation may not be calculated according to the first parameter information and the second parameter information. However, in an actual situation, the actual operation address of the application program in the terminal device is different from the chained address designated by the linker or is different from the memory address of the application program stored in the terminal device, when the application program is linked, such that a script file cannot be correctly found in the corresponding chained address during operation of the application program. Therefore, an offset value during operation of the application program needs to be calculated according to the second memory start address actually used in the memory during operation of the application program and the first memory start address designated by the linker in the memory when the application program is linked. Then, the target memory address of the target element during operation is addressed by using a relative addressing manner according to the offset value. The calculated offset value may also be used as the second parameter information, and is stored in a specified register, so that the offset value is taken out from the register and used for calculation during operation of the application program.

In the step of S104, the application program of the target version is operated by executing the script file in the target memory address.

In one embodiment, as described above, the target element of the script file includes, but is not limited to, information such as the global variable and the global function. Thus, it can be considered that the script file includes, but is not limited to, a global function code, a global variable code, and the like. Each global function or global variable has an actual operation address during operation. When the application program is operated, after a next instruction to be executed is determined, addressing of the global function or the global variable may be implemented through the aforesaid steps S101-S103. Thereafter, the global function or the global variable (i.e., the target element) in the target memory address may be executed to operate the application program of the target version.

In the embodiment, the target memory address of the target element in the operating script file can be calculated by determining the target version from multiple versions of the application program and the first parameter information in the target version and obtaining the second parameter information of the application program transmitted by the bootloader, so that the target memory address of the target element in the operating script file can be calculated even if the actual operation address of the application program in the terminal device is different from the chained address designated by the application program, and an objective of operating the application program at any address can be achieved when the application program is operated.

Figure 2:
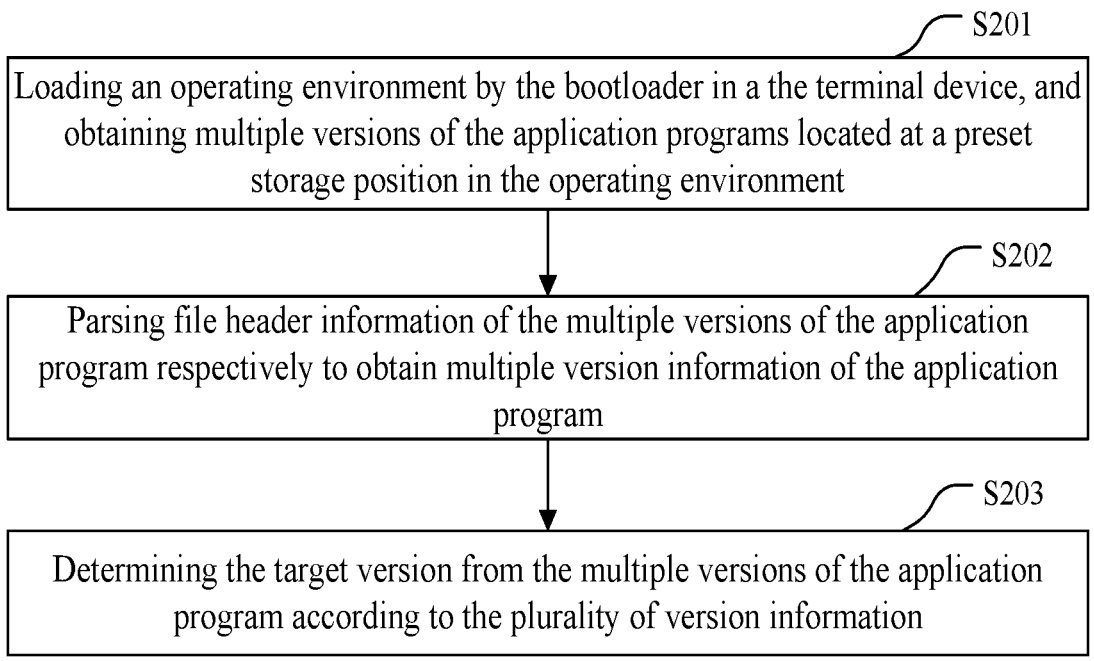
FIG. 2 illustrates a schematic implementation diagram of a step S101 of the method for operating the application program according to one embodiment of the present application.

Referring to FIG. 2, in a specific embodiment, said determining the target version from multiple versions of the application program in the step S101 specifically includes following sub-steps S201-S203, which are described in detail below:

In the step of S201, an operating environment is loaded through the bootloader in the terminal device, and application programs of multiple versions in the preset storage position in the operating environment are obtained.

In one embodiment, it is introduced in the step S102 that the bootloader is used to guide the application program started by the operating system, the bootloader may also load the operating environment of the application program. Where said obtaining the plurality of version application programs in the preset storage position in the operating environment may be interpreted as storing multiple versions of application programs at different positions of the storage space in the operating environment. When the application is started by the bootloader, the multiple versions of the application may be directly obtained at the designated storage location.

In one embodiment, the loaded operating environment is the storage environment of the application program, and it can be considered that, when the application program is operated, code segments (i.e., script files) of the whole application program are in a continuous storage medium. Therefore, the code segments (script files) of the application program can be directly executed on a flash memory that supports on-chip operation, and there is no need to preload some of the code segments of the application program into an in-chip memory area to be executed.

However, it should be noted that, currently, in order to prevent the target memory address from being affected by the chained address designated by the linker during operation of the application program, thereby achieving the purpose of operating the script files of the application program at any address, a decentralized loading method is usually adopted. That is, during operation of the application program, a part of the operating codes stored in the in-chip memory area (memory) is loaded into a random access memory (Random Access Memory, RAM) to be executed. Then, a method of operating the application program in the RAM is used to ensure that the target memory address is not affected by the chained address designated by the linker during operation of the application program. However, this method may reduce the storage space in the RAM, and is not conducive to the operation of large applications. Therefore, the method of operating the application program in the RAM does not conform to the method for operating the application program in any address in this embodiment.

In the step of S202, file header information of multiple versions of application program are respectively parsed to obtain multiple version information of the application programs.

In the step of S203, the target version is determined from multiple versions of the application program according to the multiple version information.

In one embodiment, how to parse file header information of an application program and how to determine the target version from the multiple version information have been described in the step S101, and are not repeatedly described herein.

It can be understood that, the version information includes, but is not limited to, information such as a version number, a device name, and a model. In this embodiment, the version information is described by taking the version number as an example. If the version numbers of the multiple versions are consistent, it indicates that the multiple versions are not updated, or alternatively, it indicates that the multiple versions are all the latest versions. Thus, the target version may be determined randomly from the multiple versions. However, after determining the target version and operating the application program corresponding to the target version, if the terminal device detects that the application program is updated, the terminal device may first update the application programs corresponding to the remaining versions. After updating of the remaining versions are completed, and when detecting that the currently operated application program of the target version is in an idle state, the application program corresponding to a new version is randomly selected from the plurality of updated remaining versions and is automatically started, and the application program of the current target version, which is not updated, is updated. Thus, the update of the application program is realized without affecting the normal service logic of the application program is not affected, and the influence of the service of the application program is reduced to the minimum.

In this embodiment, multiple versions of application programs are pre-stored in the terminal device, when the application program is started, the target version can be determined according to the version information corresponding to multiple versions of application programs, and the application program of the target version is started to be operated, the application programs of the remaining versions are updated, so that the updating of the application program can be realized without affecting the normal service logic of the application program, and the influence of the service of the application program can be reduced to the minimum.

In other embodiments, the terminal device generally stores a plurality of application programs, while a developer of each application program needs to determine a specific memory address for storing the corresponding application program in the terminal device when designing the application program. If the specific memory address of the application program in the terminal device is changed, the actual target memory address of the application program stored in the terminal device is inconsistent with the chained address designated by the linker. Operation of the application program in the terminal device will be failed, and the application program needs to be recompiled and installed. Therefore, the developer of the application program needs to maintain multiple sets of application program codes according to different memory addresses, and establish a one-to-one correspondence relationship between the application program codes and the memory addresses. Otherwise, once an error occurs, the application program will be paralyzed. However, in this embodiment, the target memory address of the target element in the script file of the application program during operation is calculated according to the first parameter information and the second parameter information, so that the target memory address of the target element in the executed script file can also be calculated even if the actual operation address of the application program in the terminal device is different from the chained address designated by the linker, and an effect that the target memory address of the operated application program is not influenced by the chained address designated by the linker can be achieved during operation of the application program. An objective of operating the application program at any address is achieved. An effect of unbinding the application function development with the actual memory address of the application program in the terminal device in a multi-application environment is achieved, and a convenient way for operating multiple applications on the microcontroller is provided.

Figure 3:
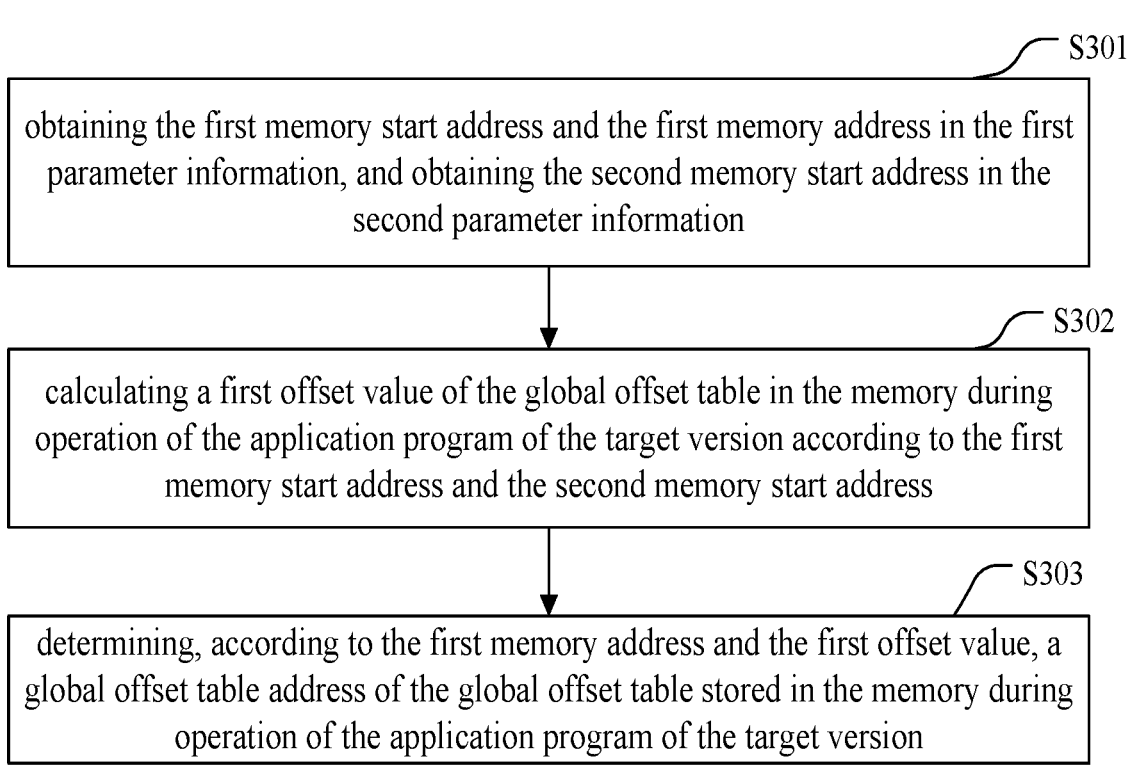
FIG. 3 illustrates one schematic implementation diagram of a step S103 of the method for operating the application program provided by one embodiment of the present application.

Referring to FIG. 3, in one specific embodiment, the target element of the script file includes a global offset table, the target memory address includes a global offset table address, the first parameter information includes a first memory start address stored in the memory and designated by the linker when the application program of the target version is linked, and a first memory address of the global offset table in the application program of the target version stored in the memory after linking. The second parameter information includes a second memory start address actually used in the memory during operation of the application program of the target version. The step S103 of calculating the target memory address of the target element of the script file of the application program of the target version during operation according to the first parameter information and the second parameter information particularly includes the following sub-steps S30-S303, which are described in detail below:

In the step of S301, the first memory start address and the first memory address in the first parameter information are obtained, and the second memory start address in the second parameter information are obtained.

In one embodiment, the global offset table (Global Offset Table, GOT) is a pointer array pointing to the global variables established by elf file in a data segment. When an operating code needs to invoke a global variable, the operating code may indirectly invoke the global variable through the pointer array corresponding to the global variable recorded in the global offset table. Since the global offset table is stored in the data segment, the pointer array corresponding to the global variable may be modified when the global offset table is loaded.

In one embodiment, the global offset table address is the address where the terminal device stores the global offset table, and the global offset table is stored in the memory. It can be understood that the global offset table address is the address of the global offset table actually stored in the memory during operation of the application program.

In the step of S302, a first offset value of the global offset table in the memory is calculated according to the first memory start address and the second memory start address during operation of the application program of the target version.

In one embodiment, the first memory start address is a chained address (i.e., the first memory start address) stored in the memory and designated by the linker, when the application program is linked. However, when the application program is started by the bootloader, the bootloader may obtain the memory address actually used in the memory during operation of the application program. If the chained address of the application program is different from the actually used memory address (the second memory start address) during operation of the application program, it indicates that there is a difference between the first memory start address and the second memory start address. Furthermore, it can be determined that the first memory address of the global offset table stored in the memory is offset accordingly. Therefore, in order to determine the actual memory address of the global offset table in the memory during operation of the application program, the first offset value during operation of the application program needs to be determined first. The first offset value may be calculated by performing addition and subtraction processing on the first memory start address and the second memory start address.

In the step of S303, the global offset table address of the global offset table stored in the memory is determined according to the first memory address and the first offset value during operation of the application program of the target version.

In one embodiment, after the first memory address and the first offset value are determined, the first offset value may be added on the basis of the first memory address to obtain the global offset table address of the global offset table stored in the memory, so that the objective of operating a compiled application program at any address in the terminal device can be achieved when the chained address of the application program is different from the operation address actually used in the memory during operation of the application program. That is, the chained address of the application program and the memory address actually used in the memory during operation of the application program are unbound. Even if the chained address of the application program is different from the memory address actually used during operation of the application program, the application program can still be normally operated at any address in the terminal device.

Figure 4:
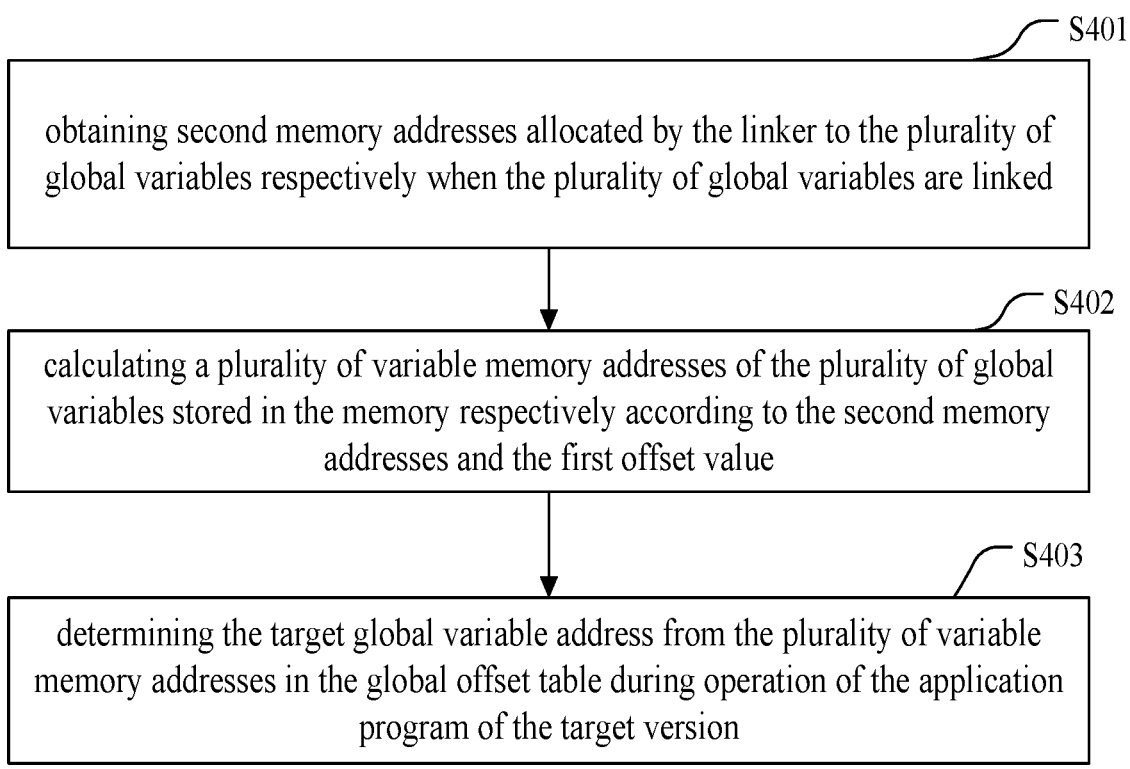
FIG. 4 illustrates another schematic implementation diagram of the step S103 of the method for operating the application program according to one embodiment of the present application.

Referring to FIG. 4, in one specific embodiment, the script file includes a plurality of global variables, the target memory address further includes a target global variable address, and a plurality of variable memory addresses of the plurality of global variables are stored in the global offset table. After the step S303 of determining the second target memory address of the global offset table in the memory according to the first memory address and the first offset value during operation of the application program, the method further includes the following steps S401-S403, which are described in detail below:

In the step of S401, second memory addresses allocated to the plurality of global variables by the linker are obtained, when the plurality of global variables are linked.

In one embodiment, in the multiple global variables, each the global variable may be created according to one or more global functions, and the global variable may be invoked by all global functions in the application program. Each global variable has a corresponding variable memory address in the terminal device. The second memory address is a chained address allocated to each global variable when the global variable is linked by the linker, which is inconsistent with the actually stored target global variable address of each global variable.

In the step of S402, a plurality of variable memory addresses of the plurality of global variables respectively stored in the memory are calculated according to the second memory address and the first offset value.

In a general condition, the linker allocates a second memory address to each global variable, when the application program is operated, the storage location of each global variable in the memory should be the second memory address. However, in the actual situation, if there is a difference between the chained address of the application program and the actually used address of the application program during operation of the application program, it indicates that the first memory start address and the second memory start address are different. Then, it is determined that the second memory addresses of the global variables stored in the memory are offset. Therefore, in order to determine the actual memory address of each global variable in the memory during operation of the application program, and the actual operation address of each global variable in the memory (i.e., the variable memory address) during operation of the application program, addition and subtraction operation needs to be performed on the second memory addresses allocated to the global variables by the linker and the first offset value during operation of the application program.

In the step of S403, a target global variable address is determined from the plurality of variable memory addresses in the global offset table during operation of the application program of the target version.

In one embodiment, after the variable memory addresses of the global variables are determined, the global variable addresses in the previous global offset table can be relocated, so that it is ensured that the corresponding global variable can be accurately obtained and processed during the operating process of the application program. The target global variable is the current required global variable during operation of the application program, that is, the target global variable. Then, the actual operation address of the target global variable may be searched in the global offset table according to the target global variable, the actual operation address of the target global variable is the target global variable address.

Figure 5:
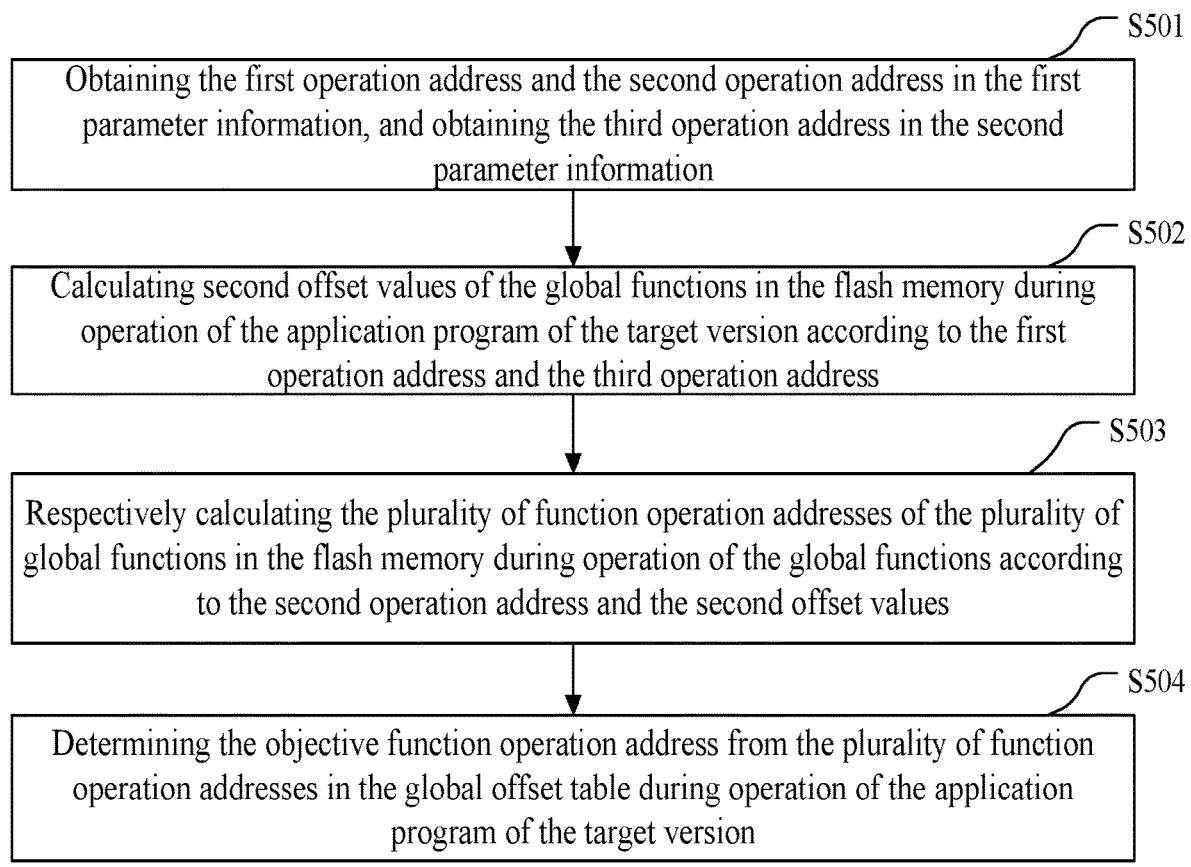
FIG. 5 illustrates yet another schematic implementation diagram of the step S103 of the method for operating the application program according to one embodiment of the present application.

Referring to FIG. 5, in one specific embodiment, the target element of the script file further includes a plurality of global functions, the global offset table address further includes an objective function operation address. The global offset table stores a plurality of function operation addresses respectively corresponding to the plurality of global functions. The first parameter information further includes a first operation address of the operated application program of the target version in the flash memory designated by the linker when the application program of the target version is linked, and a second operation address respectively allocated to the plurality of global functions by the linker when the plurality of global functions are linked. The second parameter information further includes a third operation address actually used by the application program of the target version in the flash memory during operation of the application program of the target version. after the step S303 of calculating the global offset table address of the global offset table stored in the memory during operation of the application program of the target version according to the first memory address and the first offset value, the method further includes the following steps S501-S504, which are described in detail below:

In the step of S501, the first operation address and the second operation address in the first parameter information are obtained, and the third operation address in the second parameter information are obtained.

In one embodiment, the script file generally includes the global variables and the global functions, the global functions may be invoked by a function in other files of the application program. For example, a large application program includes script files corresponding to multiple functions, and the global function may be invoked by function program(s) in one or more script files. In addition, whether a function belongs to a global function may be determined according to whether the function has been defined by a static function.

In one embodiment, when the application program is linked, the linker will specify the first operation address in the flash memory during operation of the application program. When multiple global functions are linked, the linker will specify the second operation addresses of multiple global functions in the flash memory. In a normal condition, after the linker has linked the global functions to the second operation addresses in the flash memory, the actual operation addresses of the global functions should be the second operation addresses during operation of the application program. Furthermore, when the application program is linked, the linker also specifies the first operation address of the application program in the flash memory. That is, in the normal condition, when the application program is operated in the flash memory, the first operation address should be the actual operation address of the application program.

However, in this embodiment, since the chained address (i.e., the second operation address) of the global function is different from the actual operation address (i.e., the third operation address). In order to operate the application program in the original storage location (i.e., the flash memory), there is no need to load a part of the application program that needs to be operated from the flash memory into a random access memory (Random Access Memory, RAM) to be operated, so that an occupied space of the application program in the RAM can be reduced during operation of the application program. Therefore, it is necessary to calculate the actual operation address (the third operation address) of each global function in the flash memory during operation of the application program in the flash memory. During operation of the application program, the code segments (i.e., the global function) of the whole application program is in a continuous storage medium (i.e., the flash memory), so that when a tester finds that the application program has a vulnerability, the tester may comb the context of the currently operated code segments (i.e., the global functions) in the flash memory directly according to an occurrence point of the vulnerability, thereby facilitating the development and debugging of the application program.

It should be noted that both the first operation address and the third operation address are chained addresses designated by the linker. Thus, after the chained address are designated by the linker, the chained addresses may be stored in header file information of the application program of the target version. The aforesaid second operation address is the actual operation address of the application program. When the application program of the target version are loaded and started by the bootloader, the actual operation address of the application program can be directly determined. Thus, the second operation address may be provided by the bootloader.

In the step of S920, a second offset value of the global function in the flash memory during operation of the application program of the target version is determined according to the first operation address and the third operation address.

In one embodiment, similar to calculating the first offset value of the global offset table in the memory during operation of the application program, when the second offset value of the global function in the flash memory during operation of the application program is calculated, the second offset value needs to be calculated according to difference value of the operation addresses of the global function in the flash memory during operation of the global function. In particular, the first operation address is the linked operation address of the operated application program of the target version in the flash memory designated by the linker, when the application program of the target version is linked. The third operation address is the actual operation address used in the flash memory during operation of the application program of the target version. However, the actual operation address is inconsistent with the linked operation address, so that the difference between the actual operation address and the linked operation address can be calculated, and the difference between the actual operation address and the linked operation address is used as the second offset value of the global function in the flash memory during operation of the application program of the target version.

In the step of S503, a plurality of function operation addresses of a plurality of operated global functions in the flash memory are respectively calculated according to the second operation address and the second offset value.

In the step of S504, an objective function operation address is determined from the plurality of function operation addresses in the global offset table during operation of the application program of the target version.

In one embodiment, after the second offset value is determined, according to the chained address (i.e., the second operation address) allocated to each global function by the linker, the operation address of each global function actually used in the flash memory during operation of the application program of the target version can be obtained by adding the second offset value to the chained address. Correspondingly, after the function operation addresses of the global functions are obtained, the global function that needs to be used currently is the target global function. Furthermore, the objective function operation address of the target global function may be determined in the global offset table.

Figure 6:
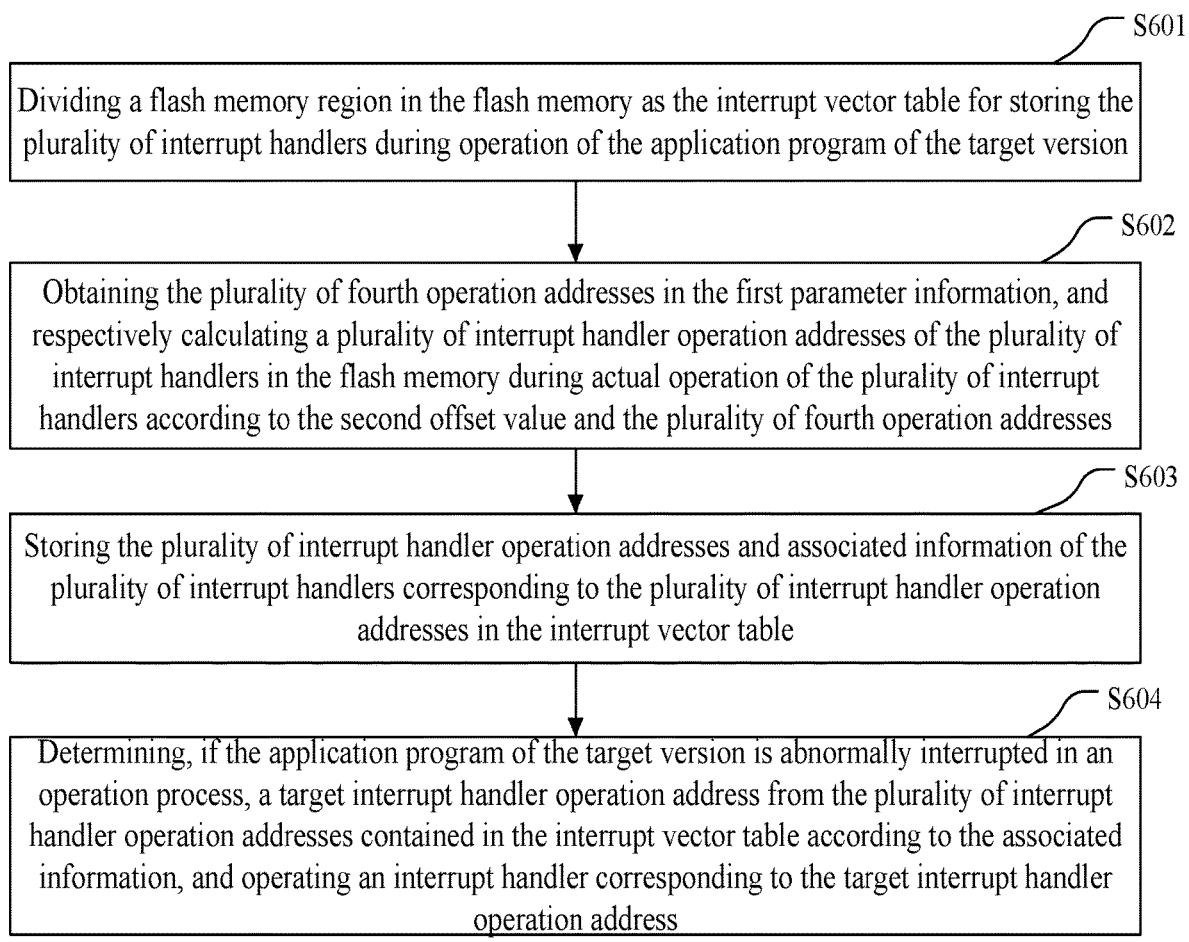
FIG. 6 illustrates yet another schematic implementation diagram of the step S103 of the method for operating the application program according to one embodiment of the present application.

Referring to FIG. 6, in one specific embodiment, the target element of the script file further includes a plurality of interrupt handlers in an interrupt vector table, and the first parameter information further includes a plurality of fourth operation addresses respectively allocated to the plurality of interrupt handlers when the interrupt vector table is generated by the linker. The method further includes the following steps S601-S604, which are described below:

In the step of S601, during operation of the application program of the target version, a flash memory region is divided in the flash memory and used as the interrupt vector table for storing the plurality of interrupt handlers.

In one embodiment, the interrupt handler is an executable script file (i.e., an interrupt service program), when the interrupt service program is executed, the interrupt service function may be implemented. The interrupt vector table includes interrupt handler operation address of the plurality of interrupt handlers. Similarly, it can be understood that, when the linker generates the interrupt vector table, the linker allocates a fourth operation address (i.e., the chained address) to each interrupt handler, the fourth operation address is inconsistent with the interrupt handler operation address (i.e., the actual operation address) of each interrupt handler in the flash memory during operation of the application program of the target version.

It should be noted that, the method of obtaining the operation address of the interrupt vector table is different from the method of obtaining the global offset table address of the global offset table. During operation of the application program of the target version, the terminal device may directly divide the flash memory area in the flash memory and take the divided flash memory area as the operation address of the interrupt vector table. Thus, there is no need to perform an offset calculation for the address of the interrupt vector table.

In the step of S602, a plurality of fourth operation addresses in the first parameter information are obtained, and, according to the second offset value and the plurality of fourth operation addresses, and a plurality of interrupt handler operation addresses of the plurality of interrupt handlers during actual operation of the plurality of interrupt handlers in the flash memory are respectively calculated according to the second offset value and the plurality of fourth operation addresses.

In one embodiment, the method of calculating the operation address of each interrupt function may refer to the described contents in the step S503. That is, the interrupt handler operation address of each interrupt handler during actual operation of the interrupt handler in the flash memory is calculated by adding the fourth operation addresses with the second offset value.

In the step of S603, the plurality of interrupt handler operation address and associated information of the plurality of interrupt handlers corresponding to the plurality of interrupt handler operation address are stored in the interrupt vector table.

In the step of S604, if the application program of the target version is abnormally interrupted in the operation process, a target interrupt handler operation address is determined from the plurality of interrupt handler operation addresses included in the interrupt vector table according to the association information, and an interrupt handler under the target interrupt handler operation address is executed.

In one embodiment, in the step S601, it is described that the interrupt handler is an executable script file. When the linker links the interrupt handlers, the association relationship between the interrupt handlers and the chained addresses may be stored in the interrupt vector table. Then, when the terminal device operates the application program of the target version, the terminal device may replace the obtained interrupt handler operation address during actual execution of each interrupt handler in the flash memory with the chained address. It is considered that, the association relationship between the operation addresses of the interrupt handler and the interrupt handlers is stored in the interrupt vector table.

In one embodiment, in case of the abnormal interruption of the application program of the target version in the operating process, the target interruption handler that should be used is set by the developer when the application program is developed. It may be considered that, after the determination of the abnormity of the terminal device, the target interrupt handler may be directly determined from the plurality of interrupt handlers according to the abnormity, then, the target interrupt handler operation address corresponding to the target interrupt handler is determined. Then, the interrupt handler under the operation address of the target interrupt function is operated according to the target interrupt handler operation address, so that the interrupt service program is executed.

In one embodiment, the method for operating application program may be specifically applied to a microcontroller in the terminal device. The microcontroller includes, but is not limited to, a microcontroller based on a reduced instruction set computing (Reduced Instruction Set Computing, RISC) architecture, a microcontroller having Cortex-M3, and the like. In this embodiment, the microcontroller having the Cortex-M3 may be used as the aforesaid microcontroller, and the characteristics of the interrupt handlers in the interrupt vector table may be re-located by using the microcontroller having the Cortex-M3, so that the relocation of the interrupt handlers in the interrupt vector table of the application program is completed. It should be noted that the method for operating the application program is applicable to any microcontroller having the characteristic of relocation of the interrupt handlers.

In addition, when one application program is operated, the operation of the application program is generally started from an entry function of the application program, and the entry function is generally compiled by a static library (crt0) in the linker. However, it is objective of calculating the target memory address of the executed script file of the application program of the target version realizing in this embodiment. In an actual processing process, in order to determine the entry function of the application program, in this embodiment, a pre-defined static library (crt0.a) needs to be used without compiling and linking on the entry function using the crt0 of the compiler. Furthermore, when the application program is compiled to generate an application program file, a_start ( ) function provided by the static library crt0.a in this embodiment may be linked to the application program file. Thus, the_start ( ) function provided by this embodiment is used as the entry function of the application program, such that when the application program is started, the terminal device can determine the_start ( ) function of the application program, and realizes relocation of the application program script file (i.e., relocation of the data segments and the code segments) according to the first parameter information and the second parameter information.

In a pre-defined static library crt0.a, a default compilation parameter of the static library crt0 may be modified. For example, -WL, -emit-relocs-fPIC (requiring the compiler to reserve all relocation information in the executable file), -msingle-pic-base (telling the compiler to generate codes irrelevant with the position) are added into the compilation parameter. Generation of the codes irrelevant with the positions is for the purpose of causing the processor to obtain an instruction relative to the relative address of the current execution instruction when an instruction is obtained. The instruction code can be correctly obtained regardless of the memory address where the instruction code is stored in the memory, -nostdlib-nostartfiles-nodefaultlibs-WL, -cref, -u, Reset_Handler-pie-Xlinker-defsym=STACK_SIZE-2048-WL is added in the link parameters (such that the linker uses the pre-defined static library (crt0.a) instead of the standard library (crt0) of the compiler, when the application is linked).

Figure 7:
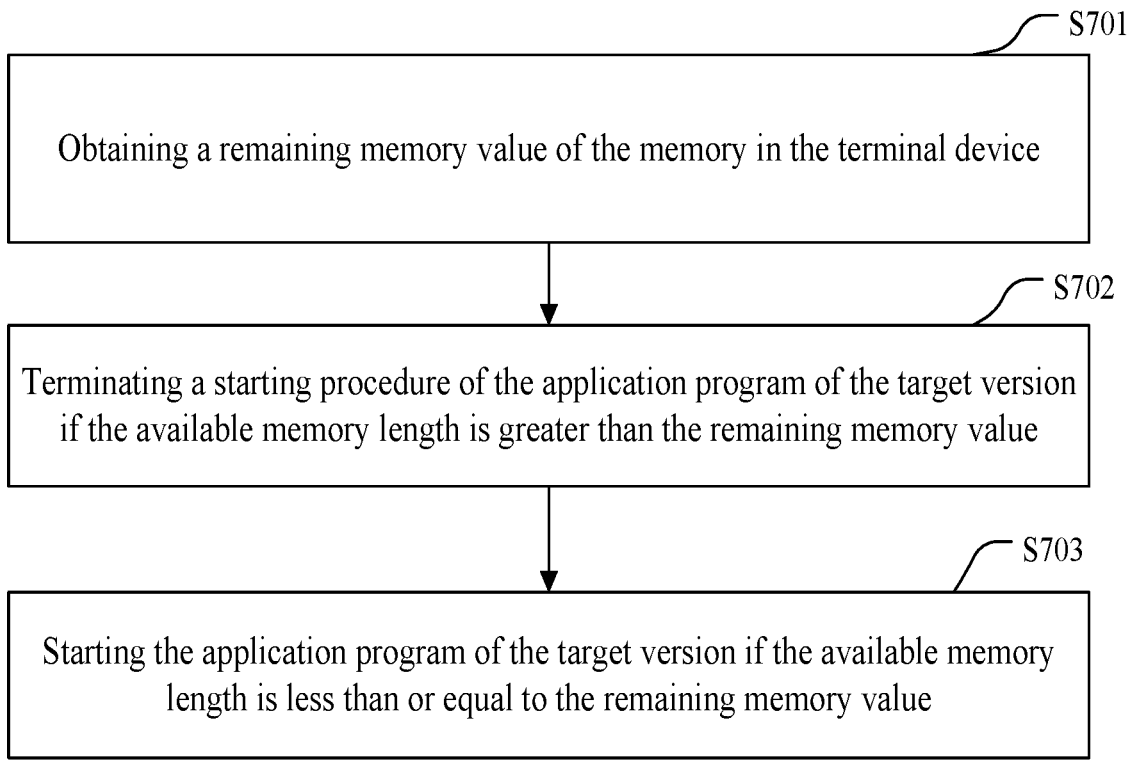
FIG. 7 illustrates an implementation flowchart of the method for operating the application program according to another embodiment of the present application.

Referring to FIG. 7, in one specific embodiment, the second parameter information further includes an available memory length of the application program of the target version, and the method further includes the following sub-steps S701-S 703, which are described below:

In the step of S701, a remaining memory value of the memory in the terminal device is obtained.

In one embodiment, the memory determines the number of application programs that the terminal device can operate at the same time and the memory size of the application programs. For example, an application A occupies a 400M of memory space when it is operating in the background of the terminal device, if the memory space of the terminal device is only 1 giga byte (Giga Byte, GB), it is only possible to start three applications that occupy a memory space equivalent to the application A at the same time. If the occupation of the memory exceeds the total memory capacity, the terminal device will be significantly stuck. Therefore, when the application program of the target version is started, the remaining memory value of the memory in the current terminal device needs to be determined first.

In the step of S702, starting of the application program of the target version is terminated, if the available memory length is greater than the remaining memory value.

In the step of S703, if the available memory length is less than or equal to the remaining memory value, the application program of the target version is started.

In one embodiment, the available memory length of the application program of the target version is the memory size of the terminal device that needs to be occupied by the application program of the target version when the application program of the target version is started by any terminal device. The available memory length of the application program of the target version can be determined and obtained by the bootloader when the application program of the target version is loaded by the bootloader. Therefore, after determining the remaining memory value, the available memory length of the application program is obtained from the bootloader. Furthermore, when the available memory length is greater than the remaining memory value, it indicates that the terminal device is stuck if the application program of the target version is started by the terminal device. When the available memory length is less than or equal to the remaining memory value, it indicates that the terminal device can start the application program of the target version smoothly.

In other embodiments, in the operating process of the application program of the target version, the execution sequence of tasks needs to be scheduled according to the sequence of time and the priority of the tasks. For example, the function of the corresponding task is executed by scheduling task time for each of the tasks. However, generally, one task is usually interrupted by the remaining tasks (e.g., high priority tasks) during execution of the task. In order to ensure that the interrupted task can be correctly recovered when the task is called, a target memory address of the last script file of the interrupted task and a target memory address of the next script file may be stored in a stack. When the interrupted task needs to be started again, the last script file information and the next script file information may be directly obtained to fill the operating environment according to the aforesaid two target memory addresses stored in the stack, so that the interrupted task is operated.

Figure 8:
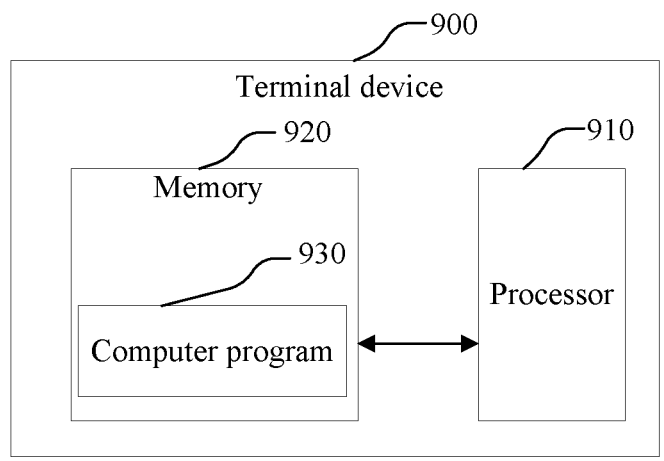
FIG. 8 illustrates a schematic structural diagram of a terminal device according to one embodiment of the present application.

FIG. 8 illustrates a structural block diagram of a terminal device 900 provided by another embodiment of the present application. As shown in FIG. 8, the terminal device 900 in this embodiment includes: a processor 910, a memory 920 and a computer program 930 (e.g., a procedure for operating the application program) stored in the memory 920 and executable by the processor 910. When executing the computer program 930, the processor 910 is configured to implement the steps (e.g., the steps S101-S104) of any one of the method embodiments for operating the computer program.

The terminal device 900 may include but is not limited to: the processor 910, the memory 920. A person of ordinary skill in the art can understand that, FIG. 8 is only one example of the terminal device 900, but should not be constituted as limitation to the terminal device 900. More or less components than the components shown in FIG. 8 may be included. As an alternative, some components or different components may be combined; for example, the terminal device 900 may also include an input and output device, a network access device, a bus, etc.

The so-called processor 910 may be a central processing unit (Central Processing Unit, CPU), and may also be other general purpose processor, digital signal processor (Digital Signal Processor, DSP), application specific integrated circuit (Application Specific Integrated Circuit, ASIC), field-programmable gate array (Field-Programmable Gate Array, FGPA), or some other programmable logic devices, discrete gate or transistor logic device, discrete hardware component, etc. The general purpose processor may be a microprocessor. As an alternative, the processor may also be any conventional processor, or the like.

The memory 920 may be an internal storage unit of the terminal device 900, such as a hard disk or a memory of the terminal device 900. The memory 920 may also be an external storage device of the terminal device 900, such as a plug-in hard disk, a smart media card (Smart Media Card, SMC), a secure digital (Secure Digital, SD) card, a flash memory card equipped on the terminal device 900. Furthermore, the memory 920 may not only include the internal storage unit of the terminal device 900 but also include the external memory of the terminal device 900.

The foregoing embodiments are only intended to explain the technical solutions of the present application, rather than limiting the technical solutions of the present application. Although the present application has been described in detail with reference to these embodiments, a person of ordinary skilled in the art should understand that, the technical solutions disclosed in the embodiments may also be amended, some technical features in the technical solutions may also be equivalently replaced. The amendments or the replacements don't cause the essence of the corresponding technical solutions to be deviated from the spirit and the scope of the technical solutions in the embodiments of the present application, and thus should all be included in the protection scope of the present application.

What is claimed is:

1. A method for operating an application program implemented by a terminal device, comprising:
   determining a target version from multiple versions of the application program, and determining first parameter information of the application program of the target version;

obtaining second parameter information of the application program transmitted by a bootloader;

determining a target memory address of an executed target element of a script file in the application program of the target version according to the first parameter information and the second parameter information; and operating the target element of the script file in the application program of the target version in the target memory address so as to operate the application program of the target version; and wherein the target element of the script file comprises a global offset table; the target memory address comprises a global offset table address; the first parameter information comprises: a first memory start address stored in a memory and designated by a linker when the application program of the target version is linked, and a first memory address of the global offset table stored in the memory after the global offset table in the application program of the target version is linked; the second parameter information comprises a second memory start address in the memory, which is actually used by the application program of the target version during operation of the application program of the target version;

said determining the target memory address of the executed target element of the script file in the application program of the target version according to the first parameter information and the second parameter information comprises:

obtaining the first memory start address and the first memory address in the first parameter information, and obtaining the second memory start address in the second parameter information;

calculating a first offset value of the global offset table in the memory during operation of the application program of the target version according to the first memory start address and the second memory start address; and determining, according to the first memory address and the first offset value, a global offset table address of the global offset table stored in the memory during operation of the application program of the target version.

2. The method according to claim 1, wherein said determining the target version from multiple versions of the application program comprises:

loading an operating environment by the bootloader in the terminal device, and obtaining multiple versions of the application program in a preset storage position in the operating environment;

parsing file header information of the multiple versions of the application program respectively to obtain multiple version information of the application program; and determining the target version from multiple versions of the application program according to the multiple version information.

3. The method according to claim 1, wherein the target element of the script file further comprises a plurality of global variables, the target memory address further comprises a target global variable address, and a plurality of variable memory addresses of the plurality of global variables are stored in the global offset table;

after said determining the second target memory address of the global offset table stored in the memory according to the first memory address and the first offset value during operation of the application program of the target version, the method further comprises:

obtaining second memory addresses allocated by the linker to the plurality of global variables respectively when the plurality of global variables are linked;

determining a plurality of variable memory addresses of the plurality of global variables stored in the memory respectively according to the second memory addresses and the first offset value; and determining the target global variable address from the plurality of variable memory addresses in the global offset table during operation of the application program of the target version.

4. The method according to claim 1, wherein the target element of the script file further comprises a plurality of global functions, the global offset table address further comprises an objective function operation address, the global offset table stores a plurality of function operation addresses corresponding to the plurality of global functions respectively; the first parameter information further comprises a first operation address of the currently operated application program of the target version in a flash memory designated by the linker when the application program of the target version is linked, and second operation addresses respectively allocated to the plurality of global functions by the linker when the plurality of global functions are linked; the second parameter information further comprises a third operation address actually used by the application program of the target version in the flash memory during operation of the application program of the target version;

after said determining, according to the first memory address and the first offset value, a global offset table address of the global offset table stored in the memory during operation of the application program of the target version, the method further comprises:

obtaining the first operation address and the second operation address in the first parameter information, and obtaining the third operation address in the second parameter information;

calculating second offset values of the plurality of global functions in the flash memory during operation of the application program of the target version according to the first operation address and the third operation address;

determining the plurality of function operation addresses of the plurality of global functions in the flash memory during operation of the global functions respectively according to the second operation address and the second offset values; and determining the objective function operation address from the plurality of function operation addresses in the global offset table during operation of the application program of the target version.

5. The method according to claim 4, wherein the target element of the script file further comprises a plurality of interrupt handlers in an interrupt vector table, the first parameter information further comprises a plurality of fourth operation addresses respectively allocated to the plurality of interrupt handlers by the linker when the interrupt vector table is generated by the linker; the method further comprises:

dividing a flash memory region in the flash memory as the interrupt vector table for storing the plurality of interrupt handlers during operation of the application program of the target version;

obtaining the plurality of fourth operation addresses in the first parameter information, and respectively calculating a plurality of interrupt handler operation addresses of the plurality of interrupt handlers in the flash memory during actual operation of the plurality of interrupt handlers according to the second offset value and the plurality of fourth operation addresses;

storing the plurality of interrupt handler operation addresses and associated information of the plurality of interrupt handlers corresponding to the plurality of interrupt handler operation addresses in the interrupt vector table; and determining, if the application program of the target version is abnormally interrupted in an operation process, a target interrupt handler operation address from the plurality of interrupt handler operation addresses contained in the interrupt vector table according to the associated information of the plurality of interrupt handlers, and operating an interrupt handler corresponding to the target interrupt handler operation address.

6. The method according to claim 5, wherein the second parameter information further comprises an available memory length of the application program of the target version; the method further comprises:

obtaining a remaining memory value of the memory in the terminal device;

terminating a starting procedure of the application program of the target version if the available memory length is greater than the remaining memory value; or alternatively starting the application program of the target version if the available memory length is less than or equal to the remaining memory value.

7. A terminal device, comprising a memory, a processor, and a computer program stored in the memory and executable by the processor, wherein, the processor is configured to, when executing the computer program, implement steps of a method for operating an application program, comprising:

determining a target version from multiple versions of the application program, and determining first parameter information of the application program of the target version;

obtaining second parameter information of the application program transmitted by a bootloader;

determining a target memory address of an executed target element of a script file in the application program of the target version according to the first parameter information and the second parameter information; and operating the target element of the script file in the application program of the target version in the target memory address so as to operate the application program of the target version;

wherein the target element of the script file comprises a global offset table; the target memory address comprises a global offset table address; the first parameter information comprises: a first memory start address stored in a memory and designated by a linker when the application program of the target version is linked, and a first memory address of the global offset table stored in the memory after the global offset table in the application program of the target version is linked; the second parameter information comprises a second memory start address in the memory, which is actually used by the application program of the target version during operation of the application program of the target version;

the processor is particularly configured to implement the step of calculating the target memory address of the executed target element of the script file in the application program of the target version according to the first parameter information and the second parameter information by:

obtaining the first memory start address and the first memory address in the first parameter information, and obtaining the second memory start address in the second parameter information;

calculating a first offset value of the global offset table in the memory during operation of the application program of the target version according to the first memory start address and the second memory start address; and determining, according to the first memory address and the first offset value, a global offset table address of the global offset table stored in the memory during operation of the application program of the target version.

8. A non-transitory computer-readable storage medium, which stores a computer program, that, when executed by a processor of a terminal device, causes the processor of the terminal device to implement steps of a method for operating an application program, comprising:

determining a target version from multiple versions of the application program, and determining first parameter information of the application program of the target version;

obtaining second parameter information of the application program transmitted by a bootloader;

determining a target memory address of an executed target element of a script file in the application program of the target version according to the first parameter information and the second parameter information; and operating the target element of the script file in the application program of the target version in the target memory address so as to operate the application program of the target version;

wherein the target element of the script file comprises a global offset table; the target memory address comprises a global offset table address; the first parameter information comprises: a first memory start address stored in a memory and designated by a linker when the application program of the target version is linked, and a first memory address of the global offset table stored in the memory after the global offset table in the application program of the target version is linked; the second parameter information comprises a second memory start address in the memory, which is actually used by the application program of the target version during operation of the application program of the target version;

said determining the target memory address of the executed target element of the script file in the application program of the target version according to the first parameter information and the second parameter information comprises:

obtaining the first memory start address and the first memory address in the first parameter information, and obtaining the second memory start address in the second parameter information;

calculating a first offset value of the global offset table in the memory during operation of the application program of the target version according to the first memory start address and the second memory start address; and determining, according to the first memory address and the first offset value, a global offset table address of the global offset table stored in the memory during operation of the application program of the target version.

9. The terminal device according to claim 7, wherein the processor is particularly configured to implement the step of determining the target version from multiple versions of the application program by:
 loading an operating environment by the bootloader in the terminal device, and obtaining multiple versions of the application program in a preset storage position in the operating environment;
 parsing file header information of the multiple versions of the application program respectively to obtain multiple version information of the application program; and
 determining the target version of the application program from multiple versions of the application program according to the multiple version information.

10. The terminal device according to claim 7, wherein the target element of the script file further comprises a plurality of global variables, the target memory address further comprises a target global variable address, and a plurality of variable memory addresses of the plurality of global variables are stored in the global offset table;
 the processor is further configured to implement following steps of:
 obtaining second memory addresses allocated by the linker to the plurality of global variables respectively when the plurality of global variables are linked;
 determining a plurality of variable memory addresses of the plurality of global variables stored in the memory respectively according to the second memory addresses and the first offset value; and
 determining the target global variable address from the plurality of variable memory addresses in the global offset table during operation of the application program of the target version.

11. The terminal device according to claim 7, wherein the target element of the script file further comprises a plurality of global functions, the global offset table address further comprises an objective function operation address, the global offset table stores a plurality of function operation addresses corresponding to the plurality of global functions respectively; the first parameter information further comprises a first operation address of the currently operated application program of the target version in a flash memory designated by the linker when the application program of the target version is linked, and second operation addresses respectively allocated to the plurality of global functions by the linker when the plurality of global functions are linked; the second parameter information further comprises a third operation address actually used by the application program of the target version in the flash memory during operation of the application program of the target version;
 the processor is further configured to implement following steps of:
 obtaining the first operation address and the second operation address in the first parameter information, and obtaining the third operation address in the second parameter information;
 calculating second offset values of the plurality of global functions in the flash memory during operation of the application program of the target version according to the first operation address and the third operation address;
 determining the plurality of function operation addresses of the plurality of global functions in the flash memory during operation of the global functions respectively according to the second operation address and the second offset values; and
 determining the objective function operation address from the plurality of function operation addresses in the global offset table during operation of the application program of the target version.

12. The terminal device according to claim 7, wherein the target element of the script file further comprises a plurality of interrupt handlers in an interrupt vector table, the first parameter information further comprises a plurality of fourth operation addresses respectively allocated to the plurality of interrupt handlers by the linker when the interrupt vector table is generated by the linker;
 the processor is further configured to implement following steps of:
 dividing a flash memory region in the flash memory as the interrupt vector table for storing the plurality of interrupt handlers during operation of the application program of the target version;
 obtaining the plurality of fourth operation addresses in the first parameter information, and respectively calculating a plurality of interrupt handler operation addresses of the plurality of interrupt handlers in the flash memory during actual operation of the plurality of interrupt handlers according to the second offset value and the plurality of fourth operation addresses;
 storing the plurality of interrupt handler operation addresses and associated information of the plurality of interrupt handlers corresponding to the plurality of interrupt handler operation addresses in the interrupt vector table; and
 determining, if the application program of the target version is abnormally interrupted in an operation process, a target interrupt handler operation address from the plurality of interrupt handler operation addresses contained in the interrupt vector table according to the associated information of the plurality of interrupt handlers, and operating an interrupt handler corresponding to the target interrupt handler operation address.

13. The terminal device according to claim 7, wherein the second parameter information further comprises an available memory length of the application program of the target version;
 the processor is further configured to implement following steps of:
 obtaining a remaining memory value of the memory in the terminal device;
 terminating a starting procedure of the application program of the target version if the available memory length is greater than the remaining memory value; or alternatively
 starting the application program of the target version if the available memory length is less than or equal to the remaining memory value.

* * * * *